United States Patent
Göbelt et al.

(10) Patent No.: US 9,518,146 B2
(45) Date of Patent: Dec. 13, 2016

(54) DISPERSING ADDITIVES BASED ON PHOSPHORIC ACID ESTER DERIVATIVES

(75) Inventors: Bernd Göbelt, Wesel (DE); Rene Nagelsdiek, Hamminkein (DE); Jürgen Omeis, Dorsten-Lembeck (DE); Frederik Piestert, Wesel (DE); Wolfgang Pritschins, Wesel (DE); Natasa Meznaric, Duisburg (DE); Daniela Schröder, Rheinberg (DE); Werner Tiegs, Rees (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 14/127,753

(22) PCT Filed: May 4, 2012

(86) PCT No.: PCT/EP2012/001906
§ 371 (c)(1),
(2), (4) Date: Feb. 27, 2014

(87) PCT Pub. No.: WO2012/175157
PCT Pub. Date: Dec. 27, 2012

(65) Prior Publication Data
US 2015/0038641 A1    Feb. 5, 2015

(30) Foreign Application Priority Data

Jun. 22, 2011  (EP) .................................... 11005093

(51) Int. Cl.
| | |
|---|---|
| *C08G 18/61* | (2006.01) |
| *C09D 7/02* | (2006.01) |
| *C08G 18/83* | (2006.01) |
| *B01F 17/00* | (2006.01) |
| *C08G 18/32* | (2006.01) |
| *C08G 18/48* | (2006.01) |
| *C08G 18/76* | (2006.01) |
| *C08G 18/28* | (2006.01) |
| *C08G 18/42* | (2006.01) |

(52) U.S. Cl.
CPC ......... *C08G 18/836* (2013.01); *B01F 17/0064* (2013.01); *C08G 18/282* (2013.01); *C08G 18/283* (2013.01); *C08G 18/284* (2013.01); *C08G 18/2825* (2013.01); *C08G 18/3271* (2013.01); *C08G 18/3275* (2013.01); *C08G 18/4277* (2013.01); *C08G 18/4833* (2013.01); *C08G 18/61* (2013.01); *C08G 18/7621* (2013.01); *C08G 18/833* (2013.01); *C09D 7/02* (2013.01); *C08G 2150/00* (2013.01)

(58) Field of Classification Search
CPC ............ C08G 18/3271; C08G 18/3275; C08G 18/836
See application file for complete search history.

(56) References Cited

U.S. PATENT DOCUMENTS

| | | | |
|---|---|---|---|
| 4,032,698 A | 6/1977 | Ashe | |
| 4,101,529 A | 7/1978 | Ammons | |
| 4,647,647 A | 3/1987 | Haubennestel et al. | |
| 4,777,195 A | 10/1988 | Hesse et al. | |
| 4,795,796 A | 1/1989 | Haubennestel et al. | |
| 4,942,213 A | 7/1990 | Haubennestel et al. | |
| 5,130,463 A | 7/1992 | Haubennestel et al. | |
| 5,914,072 A * | 6/1999 | Zirnstein ............ | B01F 17/0064 106/503 |
| 6,111,054 A | 8/2000 | Haubennestel et al. | |
| 6,680,355 B1 | 1/2004 | Weingart et al. | |
| 6,875,897 B1 | 4/2005 | Lange et al. | |
| 8,492,499 B2 | 7/2013 | Haubennestel et al. | |
| 2007/0259120 A1* | 11/2007 | Haubennestel et al. ...... | 427/384 |

FOREIGN PATENT DOCUMENTS

| | | |
|---|---|---|
| DE | 195 29 242 A1 | 2/1997 |
| DE | 198 42 952 A1 | 3/2000 |

(Continued)

OTHER PUBLICATIONS

PCT/EP2012/001906—International Search Report, Sep. 19, 2012.

(Continued)

*Primary Examiner* — Valerie Rodriguez-Garcia
(74) *Attorney, Agent, or Firm* — Curatolo Sidoti Co., LPA; Joseph G. Curatolo; Vincent A. Cortese

(57) ABSTRACT

Phosphoric acid derivatives, which are present as urea urethanes and contain a radical with an affinity for the binder in addition to at least one phosphoric acid ester group. Said phosphoric acid derivatives are especially suitable as wetting agents and dispersants. The derivatives are present according to the general formula (I)

$$Y(\text{—O—CO—NH—}R^1\text{—NH—CO—X—}Z^1)_q \quad (I)$$

wherein

Y is represented by a branched or unbranched, saturated or unsaturated organic radical containing 1 to 1000 carbon atoms, q is represented by an integer from 1 to 10, $R^1$ is represented by a saturated or unsaturated, branched or unbranched organic radical containing 6 to 20 carbon atoms, X is represented by NH and/or $NZ^2$, $Z^2$ is represented by a branched or unbranched, saturated or unsaturated organic radical, $Z^1$ is represented by a branched or unbranched, saturated or unsaturated organic radical, which contains at least two carbon atoms and at least one phosphoric acid ester group.

14 Claims, No Drawings

(56) References Cited

FOREIGN PATENT DOCUMENTS

| EP | 0 127 325 A2 | 12/1984 |
| EP | 0 318 999 A2 | 6/1989 |
| EP | 0 417 490 A2 | 3/1991 |
| EP | 0 893 155 A2 | 1/1999 |
| EP | 1 837 355 A2 | 9/2007 |

OTHER PUBLICATIONS

PCT/EP2012/001906—International Written Opinion, Sep. 19, 2012.
PCT/EP2012/001906—International Preliminary Report on Patentability, Jun. 18, 2013.

* cited by examiner

DISPERSING ADDITIVES BASED ON PHOSPHORIC ACID ESTER DERIVATIVES

CROSS REFERENCE TO RELATED APPLICATIONS

This application is a national stage application of International Application No. PCT/EP2012/001906, filed 4 May 2012, which claims priority from European Patent Application No. 11005093.7, filed 22 Jun. 2011, from which applications priority is claimed, and which are incorporated herein by reference.

The present invention relates to phosphoric acid ester derivatives, their synthesis and use, a mixture of solids, a varnish and a plastic.

Wetting agents that are dissolved or dispersed in a liquid cause a decline in the surface tension, i.e., the interfacial tension, and thereby increase the wetting power of the liquid. Wetting agents in many cases permit a surface to be wetted for the first time at all in this way.

Dispersants are suitable in general for stabilizing solid particles in binders, varnishes, pigment pastes, plastics and plastic blends, adhesives and sealing compounds, for reducing the viscosity of corresponding systems and for improving the flow properties. Dispersion stabilizers are used to stabilize dispersions that have already been produced.

High mechanical forces are necessary in order to be able to introduce solids into liquid media. It is customary to use dispersants to reduce the dispersing forces and to minimize the total energy input into the system, which is required for deflocculation of solid particles and thus also to minimize the dispersing time. In the case of such dispersants, these are surface-active substances having a cationic, anionic and/or neutral structure. In small amounts, these substances are either applied directly to the solid or are added to the dispersing medium. It is also essential that reagglomeration can also occur after complete deflocculation of the solid agglomerates in the primary particle (after the dispersing process), so that the dispersing effort is partially or completely destroyed. As a result of inadequate dispersion and/or reagglomeration, unwanted effects typically occur, such as color drift, an increase in viscosity in liquid systems and a loss of gloss in paints and coatings as well as a reduction in the mechanical strength and material homogeneity in plastics.

In practice, various types of compounds may be considered for use as wetting agents and dispersants. This is due in particular to the fact that there are a great many different systems, which are based in particular on a wide variety of types of binders with different particles to be dispersed, such as pigments, fillers and fibers.

EP 1 837 355 A relates to branched adducts that contain biuret groups and can be synthesized by addition onto uretdione groups. Such adducts are dispersants that have been tried and tested, but they are not usually optimal with regard to such quality properties as tolerability, solubility and viscosity.

U.S. Pat. No. 5,130,463 A and DE 195 29 242 each relate to the use of specific phosphoric acid esters as wetting agents and dispersants. Said phosphoric acid esters are suitable in general for dispersing solids having basic surfaces. However, optimal and complete dissolution cannot be obtained for many dispersion tasks with these phosphoric acid esters, due in part to the limited universality with respect to solids to be dispersed (it is not unusual for this to be with respect to those solids that do not have basic surfaces).

The object of the present invention was thus to supply dispersants of a high quality with the broadest possible range of applications which are suitable in particular for dispersing solids with basic surfaces.

The solution to this problem is phosphoric acid ester derivatives which are present according to the general formula (I)

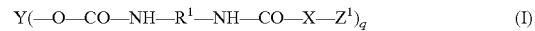

$$Y(-O-CO-NH-R^1-NH-CO-X-Z^1)_q \qquad (I)$$

wherein

Y is the same or different and is represented by a branched or unbranched, saturated or unsaturated organic radical containing 1 to 1000 carbon atoms, q may be the same or different and is represented by an integer from 1 to 10, $R^1$ may be the same or different and is represented by a saturated or unsaturated, branched or unbranched organic radical containing 6 to 20 carbon atoms, X may be the same or different and is represented by NH and/or $NZ^2$, wherein $Z^2$ may be the same or different and is represented by a branched or unbranched, saturated or unsaturated organic radical, $Z^1$ may be the same or different and is represented by a branched or unbranched, saturated or unsaturated organic radical, which contains at least two carbon atoms and has at least one phosphoric acid ester group.

The phrase "the same or different" should mean that the respective number, radical, substituent and/or molecular component may vary within a (macro)molecule as well as varying between different (macro)molecule species of the same general formula.

In general formula (I), Y is considered to be an organic radical containing 1 to 10 substituents —O—CO—NH—$R^1$—NH—CO—X—$Z^1$, wherein Y usually contains at least q carbon atoms, such that a maximum of one substituent —O—CO—NH—$R^1$—NH—CO—X—$Z^1$ is bound to the individual carbon atoms of Y.

It should be pointed out that the phosphoric acid ester derivatives according to the invention have a good dispersing effect with regard to a broad spectrum of solids to be dispersed. This is manifested in the fact that, among other things, not only can solids having basic surfaces be dispersed especially well, but also solids having neutral surfaces and even acidic surfaces can be dispersed effectively.

The phosphoric acid ester derivatives according to the invention are thus of a particularly high quality and can be used universally as wetting agents and dispersants. In addition, it is possible to state that the phosphoric acid ester derivatives according to the invention can be used successfully in both polar and apolar binder systems, and have an excellent tolerability when used as wetting agents and dispersants and/or as dispersion stabilizers. This ensures the successful use in combination with a wide variety of binders and coating materials. In addition, the phosphoric acid derivatives according to the invention permit a flocculation-free miscibility of pastes, in particular pigment pastes and/or the binders prepared with these pastes. In addition, the phosphoric acid derivatives according to the invention are suitable as dispersion stabilizers, in particular as emulsion stabilizers. The viscosity of the ground material added is definitely reduced during the dispersion as a result of the use of the phosphoric acid derivatives according to the invention, making it possible in this way to prepare formulations having a high solids content. The amount of (volatile) solvents can be reduced in this way to improve environmental safety. In summary, it can be concluded that the phosphoric acid ester derivatives according to the invention reduce the viscosity of ground goods of corresponding paints, pastes or plastic formulations while maintaining good stabilization of pigments or fillers to such an extent that processing is possible at high degrees of filling even without having a negative influence on the stability of the cured paints. Finally, it should be pointed out that the phosphoric acid ester derivatives according to the invention can be prepared economically and are based on generally available starting materials.

The present invention also relates to a method for preparing the phosphoric acid ester derivatives according to the invention, wherein a diisocyanate $R^1(NCO)_2$ is reacted with an alcohol $Y(-OH)_q$ in a first process step of this process, forming a urethane of the general formula (IV)

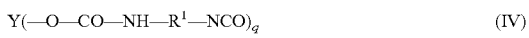

$$Y(-O-CO-NH-R^1-NCO)_q \qquad (IV)$$

and in a second step the urethane of the general formula (IV) is reacted with an amine having at least one hydroxyl group and the group X to form a urea urethane having at least one hydroxyl group wherein at least one hydroxyl group of the urea urethane is subjected in a third step to a reaction to form a phosphoric acid ester group, with the provision that Y, q, $R^1$ and X have the meanings defined above.

In a preferred embodiment of the invention, q is the same or different and is represented by an integer of 1 to 5, preferably by 1 and/or 2.

The parameter q definitively stipulates the structure of the phosphoric acid derivative molecule. The fact that q may be the same or different means that it is also possible to use mixtures of different species which differ by the q value.

Species with q>1, for example, with q=2 to 5 usually improve the antideposition properties in particular whereas species with low "q values" in particular those with q=1 usually have an increased tendency toward deflocculation behavior. It can be concluded in general that the larger the q value, the more adhesive groups there are per molecule and the greater is usually the adhesion of the molecule to solid surfaces.

To optimize the deflocculation effect, species with q=1 should preferably be used (optionally exclusively).

In a particularly preferred embodiment of the invention q is thus represented by 1 so that the phosphoric acid ester derivatives are present in the form of general formula (Ia)

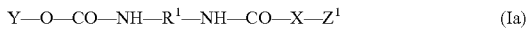

$$Y-O-CO-NH-R^1-NH-CO-X-Z^1 \qquad (Ia)$$

where
Y is the same or different and is represented by a branched or unbranched, saturated or unsaturated organic radical containing 1 to 1000 carbon atoms,
$R^1$ may the same or different and is represented by a saturated or unsaturated, branched or unbranched organic radical containing 6 to 20 carbon atoms,
X is the same or different and is represented by NH and/or $NZ^2$
where
$Z^2$ is the same or different and is represented by a branched or unbranched, saturated or unsaturated organic radical,
$Z^1$ is the same or different and is represented by a branched or unbranched, saturated or unsaturated organic radical containing at least 2 carbon atoms and having at least one phosphoric acid ester group.

A particularly preferred embodiment of the invention is represented by general formula (Ia) in which preparation of the corresponding phosphoric acid ester derivatives is performed in a particularly preferred manner on the basis of the corresponding monoalcohols Y—OH (see below). The effect of phosphoric acid derivatives where q=1 which are thus present according to general formula (Ia) is usually to be recommended when in particular a strongly deflocculating effect of the wetting agent and dispersant is desired.

In most cases Y of the phosphoric acid ester derivatives according to the invention contains at least one polyether radical, polyester radical, hydrocarbon radical and/or polysiloxane radical. Frequently Y contains not only one but a plurality of the aforementioned types of radicals.

The alcohol $Y(-OH)_q$ used in the process according to the invention may contain additional heteroatoms, such as O, S, Si and/or N and/or ether, urethane, carbonate, amide, urea and/or ester groups. Y in these groups is optionally substituted by halogen (for example, fluorine and/or chlorine). The Y radical may contain additional groups, such as C═C double bonds which are inert in the formation of the addition product. The ester, ether, urethane, carbonate and/or siloxane groups that are optionally present may be present in block structure (for example, polyethylene oxide block-propylene oxide block-ε-caprolactone), may form a gradient or may also be arranged randomly.

With regard to ether groups and/or polyethers which may be present in Y:
Examples of $Y(-OH)_q$ that may be used may also include mono-, di- or polyhydroxy polyethers which may be synthesized, for example, by alkoxylation of the compounds described above as $Y(-OH)_q$, such as alkanols, cycloalkanols, phenols with alkylene oxides, such as ethylene oxide, propylene oxide, butylene oxide, styrene oxide, aliphatic or aromatic glycidyl ethers, such as isopropyl glycidyl ether, butyl glycidyl ether, allyl glycidyl ether, 2-ethylhexylglycidyl ether, cresol glycidyl ether and phenyl glycidyl ether. Mixtures of these raw materials may also be used. In the case of mixed polyethers, they may be arranged randomly, in gradient form or in blocks.

These polyethers often have a number-average molecular weight (Mn) in the range of approx. 100 to 25,000, especially frequently from 150 to 15,000 and especially typically from 200 to 10,000 g/mol.

Polyethers based on ethylene oxide, propylene oxide and mixtures thereof are preferred.

Examples include hydroxyfunctional vinyl compounds, such as hydroxybutylvinyl ether, monohydroxy-functional polyoxyalkylene monoalcohols, such as allyl polyether (e.g., polyglycol A 350, polyglycol A 500, polyglycol A 1100, polyglycol A 11-4, polyglycol A 20-10 or polyglycol A 20-20 of Clariant AG or Pluriol® A 010 R, Pluriol® A 11 RE, Pluriol® A 13 R, Pluriol® A 22 R or Pluriol® A 23 R of BASF AG), vinyl polyethers (such as polyglycol V 500, polyglycol V 1100 or polyglycol V 5500 of Clariant AG), methanol-initiated polyoxyethylene monoalcohols (such as Pluriol® A 350 E, Pluriol® A 500 E, Pluriol® A 750 E, Pluriol® A 1020 E, Pluriol® A 2000 E or Pluriol® A 5010 E of BASF AG), alkanol-initiated polyoxypropylene monoalcohols (such as polyglycol B01/20, polyglycol B01/40, polyglycol B01/80, polyglycol B01/120 or polyglycol B01/240 of Clariant AG or Pluriol® A 1350 P or Pluriol® A 2000 P of BASF AG) and polyalkoxylates with a variable degree of alkoxylation, initiated with various fatty alcohols (available under the brand names Lutensol® A, Lutensol® AT, Lutensol® AO, Lutensol® TO, Lutensol® XP, Lutensol® XL, Lutensol® AP and Lutensol® ON of BASF SE). Polyoxyalkylene monoalcohols containing ethylene oxide and/or propylene oxide and/or butylene oxide groups and optionally modified with styrene oxide are preferred. It is particularly preferred to use polyoxyalkylene monoalcohols (such as polyglycol B 11/50, polyglycol B 11/70, polyglycol B 11/100, polyglycol B 11/150, polyglycol B 11/300 or polyglycol B 11/700 of Clariant AG, Pluriol® A 1000 PE, Pluriol® A 1320 PE, or Pluriol® A 2000 PE of BASF AG or Terralox WA 110 of DOW Chemicals) which are butanol-initiated polyoxyalkylenes of ethylene and propylene oxide with a terminal OH group.

Y usually contains 1 to 450 ether oxygen atoms which are preferably present in groups containing ether oxygen atoms derived from polytetrahydrofuran, polyoxetanes and/or polyoxiranes.

Y preferably contains 3 to 400 ether oxygen atoms, at least 50 preferably at least 80 mol % of the ether oxygen atoms being present in ethylene oxide and/or propylene oxide structure units.

Regarding the hydrocarbon radicals that may be present in Y:

The hydrocarbon radicals are preferably present in the form of an allyl radical, branched or unbranched alkylaryl radical, aralkyl radical and/or as acyclic, cyclic, branched or unbranched alkyl radical. Mixtures of such compounds, i.e., at least two different compounds $Y(—OH)_q$ may also be used. The aliphatic or araliphatic compounds $Y(—OH)_q$ may be linear or branched, saturated or unsaturated. Saturated species are preferred.

Examples of $Y(—OH)_q$ with hydrocarbon radicals in which q=1 include methanol, ethanol, butanol, ethyl hexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkyl phenols, alkyl naphthols and phenyl ethanol.

Examples of $Y(—OH)_q$ with hydrocarbon radicals in which q>1 include butanediol, hexanediol, cyclohexane dimethanol, neopentyl glycol, ethylene glycol, glycerol, trimethylolpropane and sugars (such as pentaerythritol).

In addition, $Y(—OH)_q$ polyolefin polyols or monools, such as nonhydrogenated, partially hydrogenated and/or completely hydrogenated polybutadienes, nonhydrogenated, partially hydrogenated and/or completely hydrogenated polyisoprenes, polyisobutylenes, polypropylene or ethylene/butylene copolymers may be used. These compounds are known. Thus, for example, access to hydroxy-functional polyisobutylenes is described in U.S. Pat. No. 6,875,897.

Regarding the ester groups and/or polyesters which may be present in Y:

Monohydroxy monoesters and mono-, di- or polyhydroxy polyesters may also be used as $Y(—OH)_q$.

Hydroxy-functional acrylates or methacrylates, such as hydroxyethyl acrylate, hydroxyethyl methacrylate, hydroxybutyl (meth)acrylate are examples of suitable monohydroxy monoesters.

Polyesters, for example, can be synthesized by reacting dicarboxylic acids as well as their esterifiable derivatives, such as anhydrides, acid chlorides or dialkyl esters (such as dimethyl esters or diethyl esters) by reaction with diols and mono-, di- or trifunctional initiator components. The formation of dihydroxy polyesters can be suppressed as needed by using stoichiometric amounts of monohydroxy compounds. The esterification may be performed in substance or by azeotropic esterification in the presence of an entraining agent. Examples of dicarboxylic acids include succinic acid, maleic acid, fumaric acid, glutaric acid, adipic acid, sebacic acid, pimelic acid, phthalic acid or dimerized fatty acids and their isomers as well as hydrogenation products. Examples of corresponding diols include ethylene glycol, 1,2-propanediol, 1,3-propanediol, 1,4-butanediol, 1,6-hexanediol, neopentyl glycol, cis-1,2-cyclohexane dimethanol, trans-1,2-cyclohexane dimethanol, as well as polyglycols based on ethylene glycol and/or propylene glycol.

Preferred polyesters for use as $Y(—OH)_q$ include those that can be obtained by polycondensation of one or more optionally alkyl-substituted hydroxycarboxylic acids and/or ring-opening polymerization of the corresponding lactones, such as propiolactone, valerolactone, butyrolactone, caprolactone and/or substituted lactones by means of a mono-, di- or trihydroxy initiator component (as described in U.S. Pat. No. 4,647,647). These preferably have a number-average molecular weight Mn of 150 to 5000 g/mol. In principle, all the other compounds listed as $Y(—OH)_q$ may also be used as initiator components. Mixtures of the aforementioned compounds may also be used. The lactone polymerization is performed by known methods, initiated by titanates, p-toluenesulfonic acid or dibutyltin dilaurate, for example, at temperature from approx. 70° C. to 180° C. Polyesters based on ε-caprolactone, optionally in combination with δ-valerolactone are especially preferred.

Regarding urethane radicals and/or polyurethanes that may be contained in Y:

Polyurethanes, polyether polyurethanes, polyester polyurethanes and/or polyether polyester polyurethanes that can be obtained by addition reaction of diisocyanates with dihydroxy compounds in the presence of mono-, di- or trifunctional initiator components may also be used as $Y(—OH)_q$. Diols with 2 to 12 carbon atoms, polyoxyalkylene glycols and dihydroxy-functional polyesters may also be used as hydroxyl compounds for synthesis of the $Y(—OH)_q$ compounds containing urethane groups. The polyethers on the polyesters are described above.

Regarding the polycarbonates that may be contained in Y:

The Y radical may also contain carbonate groups, such as those obtained by known reactions with open chain or cyclic carbonates. For example, linear polyesters or polycarbonate diols modified with carbonates, such as those used in the synthesis of polyurethane are suitable. Examples include those described in U.S. Pat. No. 4,101,529. Suitable carbonates include, for example, aliphatic, cycloaliphatic, araliphatic and/or aromatic carbonic acid esters, such as dialkyl carbonates, i.e., dimethyl carbonate, diethyl carbonate or diphenyl carbonate, catechol carbonate or cyclic alkylene carbonates. Cyclic alkylene carbonates with 5- or 6-membered rings which may optionally be substituted are especially suitable. Preferred substituents include aliphatic, cycloaliphatic and/or aromatic groups with up to 30 carbon atoms. Examples of suitable cyclic alkylene carbonates include ethylene carbonate, ethylene carbonate, propylene carbonate, glycerol carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

Regarding polyoxazolines which may be contained in Y:

Hydroxyfunctional poly-2-alkyl-2-oxazolines or poly-2-alkyl-2-oxazines may also function as $Y(—OH)_q$. Monohydroxy-functional compounds are preferably used. Poly-2-alkyl-2-oxazolines or poly-2-alkyl-2-oxazines are obtained by cationic, ring-opening polymerization of 2-alkyl-2-oxazolines or 2-alkyl-2-oxazines with initiators, such as para-toluenesulfonic acid, methyl tosylate or methyl triflate. The oxazolinium or oxazinium end groups resulting from the living cationic polymerization mechanism can be converted to the more stable hydroxyamides by alkaline hydrolysis via amino ester end groups. An alternative method of synthesis of monohydroxy-functional poly-2-alkyl-2-oxazolines or poly-2-alkyl-2-oxazines is by polymerization with 2-(4-hydroxyphenyl)-N-methyl-2-oxazolinium trifluoromethane sulfonate as the initiating species (A. Gross, G. Maier, O. Nuyken, Macromol. Chem. Phys. 197, 2811-2826 (1996)). The tolerability can be controlled through the choice of the alkyl substituents so that, for example, poly-2-ethyl-2-oxazoline is suitable for highly polar systems because of its water solubility, whereas poly-2-lauryl-2-oxazoline, for example, is compatible in apolar systems. If block copolymers of 2-ethyl-2-oxazoline and 2-lauryl-2-oxazoline are formed, then the polymers are characterized by a particularly broad compatibility. Such poly-2-alkyl-2-oxazoline or poly-2-alkyl-2-oxazines usually have a number-average molecular weight Mn of 300 to 20,000 g/mol, preferably from 500 to 10,000 g/mol. Various 2-oxazolines which might also have additional functional groups may also be used. Such species include, for example, the corresponding 2-oxazolines based on fatty acids.

Regarding OH-functional polymers of ethylenically unsaturated compounds that may be present in Y:

OH-functional polymers of ethylenically unsaturated monomers may also be used as $Y-(OH)_q$.

The OH functions may be introduced in the known way by way of the ethylenically unsaturated monomers, initiators or chain regulators. Monohydroxy-functional polyacrylic acid esters and/or polymethacrylic acid esters are preferred. Such compounds have already been used for the synthesis of other dispersants in this field of technology, such as those described in U.S. Pat. No. 4,032,698 A and/or in EP 318 999. These polyacrylates usually have a number-average molecular weight Mn of 300 to 20,000 g/mol, preferably usually from 500 to 10,000 g/mol. These may be formed in a block structure or may be randomly arranged or may form a gradient.

Examples of OH-functionally ethylenically unsaturated monomers include hydroxyalkyl (meth)acrylates of linear, branched or cycloaliphatic diols with 2 to 36 atoms, such as 3-hydroxypropyl methacrylate, 3,4-dihydroxybutyl monomethacrylate, 2-hydroxyethyl (meth)acrylate, 4-hydroxybutyl (meth)acrylate, 2-hydroxypropyl methacrylate, 2,5-dimethyl-1,6-hexanediol monomethacrylate; caprolactone and/or valerolactone-modified hydroxyalkyl (meth) acrylates (wherein the hydroxy (meth)acrylates are preferably derived from linear, branched or cycloaliphatic diols with 2 to 8 carbon atoms); OH-functional poly(ethylene glycol) (meth)acrylate and OH-functional poly(propylene glycol) (meth)acrylate.

Examples of additional ethylenically unsaturated monomers includes alkyl (meth)acrylates of linear, branched or cycloaliphatic alcohols with 1 to 22 carbon atoms, such as methyl (meth)acrylate, ethyl (meth)acrylate, n-butyl(meth) acrylate, isobutyl (meth)acrylate, tert-butyl (meth)acrylate, lauryl (meth)acrylate, 2-ethylhexyl (meth)acrylate, stearyl (meth)acrylate, cyclohexyl (meth)acrylate, isobornyl (meth) acrylate and tert-butyl (meth)acrylate; aryl (meth)acrylates, such as benzyl methacrylate or phenyl acrylate (wherein the aryl radicals may each be unsubstituted or substituted up to four times), such as 4-nitrophenyl methacrylate; mono (meth)acrylates of ethers, polyethylene glycols, polypropylene glycols or mixed polyethylene/propylene glycols with 5 to 80 carbon atoms, such as tetrahydrofurfuryl methacrylate, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate, poly(propylene glycol)methyl ether (meth)acrylate; aminoalkyl (meth)acrylate, such as N,N-dimethylaminoethyl (meth)acrylate, 2-trimethyl-ammoniumethyl methacrylate chloride and N,N-dimethylaminopropyl (meth)acrylate; (meth)acrylates of halogenated alcohols, such as perfluoroalkyl (meth)acrylates with 6 to 20 carbon atoms; styrene and substituted styrenes, such as 4-methylstyrene, methacrylonitrile and acrylonitrile; ethylenically unsaturated heterocycles, such as, for example, 4-vinylpyridine and 1-[2-(methacryloyloxy)ethyl]-2-imidazolidinone; vinyl esters of carboxylic acids with 1 to 20 carbon atoms, such as vinyl acetate; maleinimide, N-phenylmaleinimide and N-substituted maleinimides with linear, branched or cycloaliphatic alkyl groups with 1 to 22 carbon atoms, such as N-ethylmaleinimide and N-octylmaleinimide; (meth)acrylamide; N-alkyl- and N,N-dialkyl-substituted acrylamides with linear, branched or cycloaliphatic alkyl groups with 1 to 22 carbon atoms, such as N-(tert-butyl) acrylamide and N,N-dimethylacrylamide.

Preferred monomers that are not OH-functional include alkyl (meth)acrylates, aryl (meth)acrylates and styrene.

Regarding polysiloxanes which may be present in Y:

Mono- or polyhydroxy-functional polysiloxanes may also be used as $Y-(OH)_q$.

The polysiloxanes can be described with the general formula shown below:

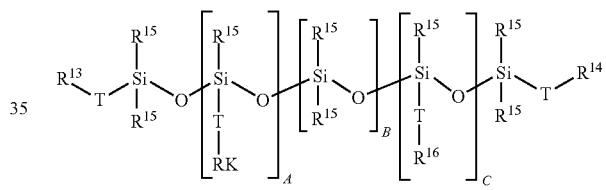

where
$T=C_1-C_{14}$ alkylene,
RK=unbranched polyether radical of alkylene oxide units with 1 to 6 carbon atoms and/or aliphatic and/or cycloaliphatic and/or aromatic polyester radical with a weight-average molecular weight between 200 and 4000 g/mol,
$R^{13}$ and $R^{14}$ each independently is represented by
   $C_1-C_{14}$ alkyl, aryl or aralkyl, $-O(C_1-C_{14}$ alkyl, aryl or aralkyl), $-OCO(C_1-C_{14}$ alkyl, aryl or aralkyl), $-O-CO-O(C_1-C_{14}$ alkyl, aryl or aralkyl), $-OSO_2$ $(C_1-C_{14}$ alkyl, aryl or aralkyl), $-H$, $-Cl$, $-F$, $-OH$, $-R$, $-RK$,
$R^{15}=C_1-C_{14}$-alkyl, -aryl or -aralkyl,
$R^{16}$=polyhydroxy-functional branched polyglycidol polyether radical consisting of or containing a branched polyglycidol group,
A=0-20, preferably 1-15, especially preferably 1-8,
B=2-300, preferably 10-200, especially preferably 15-100 and
C=0-20, preferably 1-15, especially preferably 1-8,
wherein when C=0, $R^{14}=R^{16}$ and/or $R^{13}=R^{16}$. When the unit $-[SiR^{15}(Z-R^{16})]-O-$ is present, i.e., C is at least 1, then it is possible for $R^{13}$ and $R^{14}$ to be different from $R^{16}$.

The polysiloxane radicals listed above may also be present as organo-modified polysiloxane radicals.

Regarding the diisocyanate used and or regarding $R^1$:

The diisocyanate in the method according to the invention may include in particular the aliphatic, cycloaliphatic and/or aromatic diisocyanates with 6 to 15 carbon atoms that are known from polyurethane chemistry, such as tetramethylene diisocyanate, hexamethylene diisocyanate, 1,2-diisocyanatocyclohexane, 1,3 diisocyanatocyclohexane, 1,4-diisocyanatocyclohexane, isophorone diisocyanate, dicyclohexylmethane-2,4'-diisocyanate, trimethylhexamethylene diisocyanate, dodecamethylene diisocyanate, toluene 2,4-diisocyanate, toluene 2,6-diisocyanate, diphenylmethane diisocyanate, methylene bis(4-cyclohexylisocyanate) or 1,4-cyclohexane bis(methyl isocyanate).

Usually $R^1$ of the phosphoric acid ester derivatives according to the invention is the same or different and is present in the form of a hydrocarbon radical, preferably as an arylene group, as a branched or unbranched alkylarylene group and/or as an acyclic, cyclic, branched or unbranched alkylene group.

$R^1$ especially preferably results from the hydrocarbon radical of a diisocyanate containing two differently reactive NCO groups, preferably toluene 2,4-diisocyanate and/or isophorone diisocyanate.

In a preferred embodiment of the invention, $Z^1$ of the phosphoric acid ester derivatives according to the invention is the same or different and is represented by the general formula (II)

$$R^2\text{—O—PO}(OR^3)_n(OH)_{2-n} \qquad (II)$$

where
$R^2$ is the same or different and is represented by a saturated or unsaturated, branched or unbranched organic radical containing at least two carbon atoms,
$R^3$ is the same or different and is represented by a saturated or unsaturated, branched or unbranched organic radical containing at least one carbon as well as
n is the same or different and is represented by 0 and/or 1.

Preferably n is 0.

However, n may also be 1, and then $R^3$ is represented by $R^2$—X—CO—NH—$R^1$—NH—CO—O—Y. Such substitution patterns may occur when using special phosphorylation agents in particular, for example, phosphoryl chloride (see below).

As a rule $R^2$ is the same or different and is represented by a saturated, linear $C_2$-$C_{40}$ alkylene radical.

$Z^2$ is usually the same or different and is represented by a $C_1$-$C_{50}$ hydrocarbon radical, optionally containing ether groups and/or a radical present according to the general formula (III)

$$R^4\text{—O—PO}(OR^5)_m(OH)_{2-m} \qquad (III)$$

where
$R^4$ is the same or different and is represented by a saturated or unsaturated, branched or unbranched organic radical containing at least two carbon atoms,
$R^5$ is the same or different and is represented by a saturated or unsaturated, branched or unbranched organic radical containing at least one carbon as well as
m is the same or different and is represented by 0 and/or 1.

Frequently m is 0 and $R^4$ is the same or different and is preferably represented by a saturated, linear $C_2$-$C_{40}$ alkylene radical.

The phosphoric acid ester derivatives according to the invention may be present in unsalted, partially salted and/or salted form. If it is present in unsalted, salted and/or partially salted form, this usually depends first on the respective chemical environment (pH) and second on the type of phosphoric acid ester derivative as such. Monobases and polybases may be considered as salinization components.

In the method according to the invention, the isocyanate addition may take place in the temperature range from room temperature to approx. 150° C., preferably up to 100° C., especially preferably up to 70° C., which is customary for this type of reaction, depending on the reactivity of the individual reactants. To accelerate the reaction and reduce side reactions, the usual known catalysts may be used, such as tertiary amines, triethylamine, dimethylcyclohexylamine N-methylmorpholine, N,N'-dimethyl-piperazine, 2-(dimethylaminoethoxy)ethanol, diazabicyclo(2.2.2)octane and similar compounds as well as in particular organic metal compounds, such as titanic acid esters, iron compounds, such as iron(III) acetylacetonate, tin compounds, for example, tin diacetate, tin dioctoate, tin dilaurate or the dialkyl derivatives of tin dialkyl salts of aliphatic carboxylic acids, such as dibutyltin diacetate, dibutyltin dilaurate or the like. These catalysts are usually used in amounts of 0.0001 to 0.1 parts by weight per 100 parts by weight diisocyanate.

In a preferred embodiment, a diisocyanate $R^1(NCO)_2$ which has two differently reactive NCO groups is used, preferably toluene 2,4-diisocyanate and/or isophorone diisocyanate which are used in step 1 in a molar ratio of at least (1.1*arithmetic mean of q):1.0, preferably at least (2.0*arithmetic mean of q):1.0 with respect to the alcohol $Y(\text{—OH})_q$, so this yields a diisocyanate that has not reacted to form urethane of the general formula (IV) and is preferably removed from the reaction mixture by distillation before performing the second step, and then in the third step, polyphosphoric acid is preferably used for the reaction of at least one hydroxyl group of urea urethane.

The character * used above means multiplied (times).

The term "arithmetic mean of q" should mean that an arithmetic mean of q is used as the basis, this mean being formed from all the q values of the individual urethanes that fall under the general formula (IV). For example, if q=2 is achieved with exactly half of the urethanes that fall under general formula (IV), and if q=4 is achieved with the other half of the urethanes that fall under formula (IV) accordingly, then the corresponding arithmetic mean would be 3.

The use of the diisocyanate containing the various reactive NCO groups in a molar excess results in a higher selectivity to the extent that preferably only exactly one NCO group of the diisocyanate is reacted in the first step. The greater the molar excess of the diisocyanate, the greater is normally the selectivity with respect to synthesis of the monoisocyanate created in the first step. The unreacted diisocyanate obtained because of the substance being used in excess is preferably removed completely from the reaction mixture in order to ultimately minimize the amount of diurea formed from it. However, the reaction taking place in the second step to form the urea urethane should take place preferably with an adequate amount of amine, so that the amount of isocyanate groups remaining in the reaction mixture (in particular also the residual amount of diisocyanate) is reduced to a particularly great extent. The ready-to-use reaction mixture should optimally be as free of diisocyanate as possible due to the high quality requirements. However, the amount of urethane of general formula (IV) synthesized in the first process step should be reduced as much as possible.

The at least one hydroxyl group used in the process according to the invention and the amines containing group X usually have the following general structures:

$$H_2N—R^2—OH$$

$$HZ^2N—R^2—OH$$

$$HN(—R^2—OH)_2$$

wherein $Z^2$ and $R^2$ are described above but are preferably the same as or different from $R^2$ and are represented by a branched or unbranched alkylene group with 2 to 12 carbon atoms.

Specific examples of corresponding OH-functional amines include ethanolamine, propanolamine, isopropanolamine, 5-aminopentanol, 2-(2-aminoethoxy)ethanol, N-methylethanolamine, N-ethylethanolamine, N-butylethanolamine, diethanolamine, 3-((2-hydroxyethyl)amino)-1-propanol, diisopropanolamine and N-(2-hydroxyethyl)-aniline.

The urethane (IV) normally reacts with the OH-functional amine to form urea urethane under the same reaction conditions as the addition of the alcohol component $Y(—OH)_q$ onto the diisocyanate. Since the amine of the OH-functional amine reacts much more rapidly with the isocyanate group of the urethane (IV) than does the hydroxyl function, the addition reaction may be performed even without catalysts.

The phosphoric acid esters according to the invention are preferably synthesized by reacting at least one hydroxyl group of the urea urethane with an ester-forming phosphorus compound.

An ester-forming phosphorus compound is understood to be a compound capable of forming phosphoric acid ester by reaction with a compound that contains hydroxyl groups. Examples of ester-forming phosphorus compounds include polyphosphoric acid, phosphorus pentoxide, phosphorus oxychloride and acetyl phosphate. Polyphosphoric acid and phosphorus pentoxide are preferred, but polyphosphoric acid is especially preferred. Mainly monoesters are formed with polyphosphoric acid and monoester/diester mixtures are formed with phosphorus pentoxide. The monoesters are preferred. It is also possible that a mixture of various components to be phosphorylated is used in the phosphorylation reaction.

Reaction of the ester-forming phosphorus compounds with the hydroxyl compounds preferably takes place in the absence of a solvent at temperatures up to 150° C., preferably below 100° C. However, the reaction may also be performed in the presence of suitable inert solvents (for example, methoxypropyl acetate).

The phosphoric esters are capable of forming salts due to the acid groups. In the sense of the present invention, they may also be used in the form of the corresponding salts. In many cases, an improved efficacy and/or improved solubility or tolerability can be achieved through such a partial or complete salinization. In applications in which the acidity of the products causes interference, improvements can often be achieved through partial or complete neutralization. Suitable salinization compounds include alkaline (earth) metal salts, such as carbonates, bicarbonates or hydroxides, low-molecular amines, such as triethanolamine, diethyl ethanolamine, dibutyl ethanolamine and oleylamine. In addition, salts of the phosphoric acid ester compounds according to the invention with polymeric amines (polyamines, aminic (meth)acrylate copolymers, polyallylamines) are possible as wetting agents and dispersants according to EP-A-0 893 155.

The compounds according to the invention may be synthesized in bulk or in the presence of suitable solvents, solvent mixtures or other suitable carrier media, depending on the viscosity. All solvents or carrier media which are not reactive under the selected reaction conditions or whose reactivity with the reactants is negligible and in which the reactants and the reaction products are at least partially soluble are suitable. These include, for example, hydrocarbons, such as toluene, xylene, aliphatic and/or cycloaliphatic gasoline fractions, chlorinated hydrocarbons, such as chloroform, trichloroethane, cyclic and acyclic ethers, such as dioxane, tetrahydrofuran, polyalkylene glycol dialkyl ethers, such as dipropylene glycol dimethyl ether, esters of mono-, di- or polycarboxylic acids, such as ethyl acetate, butyl acetate, butyrolactone, dimethyl-2-methylglutarate, triacetin, phthalates or other plasticizers, di- or polycarboxylic acid esters, dialkyl esters of $C_2-C_4$ dicarboxylic acids that are referred to as "dibasic ester", alkyl glycol esters, such as ethyl glycol acetate, methoxypropyl acetate, ketones, such as methyl isobutyl ketone, cyclohexanone, acetone, acid amides, such as dimethylformamide, N-methyl-pyrrolidone and the like. The solvent(s) and/or the carrier media is/are already selected by taking into account the planned field of use. For example, solvents which can be diluted entirely or partially with water are used for the compounds according to the invention for use in water-dilutable paint systems or for coverage of pigments in aqueous suspension after pigment synthesis. If these products are used under conditions in which the absence of volatile organic compounds (VOC) is not desired, for example, then the formulation should be as solvent-free as possible or used in carrier materials considered to be as free of VOC as possible.

Depending on the field of application, the solvents used for the synthesis may remain in the reaction mixture or may be removed entirely or partially and replaced by other solvents or carrier media, if necessary.

The solvent may be removed entirely or partially by distilling it off, optionally under reduced pressure and/or azeotropically with the addition of water, for example. However, the active substance may also be isolated by precipitation by adding nonsolvents, such as aliphatic hydrocarbons, e.g., hexane and then isolated by separation by filtration and optionally drying. The active substance obtained by any of these methods may then be dissolved in a solvent suitable for the respective field of application or may optionally be used in pure form, for example, in powder coatings or applied to inert carriers. For applications in which the use of solids is preferred, such as powder coatings or certain plastics processing methods, the compounds may also be converted to a solid form by additional known methods. Examples of such methods include microencapsulation, spray drying, adsorption onto a solid carrier, such as $SiO_2$, or PGSS methods (particles from gas-saturated solutions).

In the first step of the process, a monoalcohol Y—OH is preferably used as the alcohol, wherein the diisocyanate $R^1(NCO)_2$ is used in a molar ratio of at least 1.1:1.0, preferably at least 2.5:1 with respect to the monoalcohol Y—OH.

High quality wetting agents and dispersants with an especially good deflocculant effect are usually produced in this way.

The present invention also relates to an additive composition that can be synthesized according to the method described above and in which a monoalcohol Y—OH is used as the alcohol, and the diisocyanate $R^1(NCO)_2$ is used in a molar ratio of at least 1.1:1.0, preferably at least 2.5:1 with respect to the monoalcohol Y—OH. This additive composition according to the invention contains the following components:
  i) 10 to 100 wt % of the phosphoric acid ester derivatives described above,
  ii) 0 to 10 wt % diurethane according to the general formula Y—O—CO—NH—$R^1$—NH—CO—O—Y, where Y is the same or different,
  iii) 0 to 10 wt % diurea of the general formula $Z^1$—X—CO—NH—$R^1$—NH—CO—X—$Z^1$, where $Z^1$ is the same or different and
  iv) 0 to 8 wt % urethane of the general formula Y—O—CO—NH—$R^1$—NCO.

The additive composition synthesized by the method according to the invention ("technical grade" phosphoric acid derivatives, which are provided for use and optionally contain characteristic "by-products") often contain small amounts of diurethane and diurea accordingly. Such small amounts of diurethane and/or diurea usually do not cause any detectable exacerbation with respect to use as a wetting agent and dispersant and are a definite indication that the additive composition was synthesized by the method according to the invention. Through the use of corresponding amounts of the amine in the second step of the method according to the invention, the amount of urethane of the general formula Y—O—CO—NH—$R^1$—NCO can usually be reduced almost to zero, which is advantageous for the quality of the additive compositions according to the invention in most cases. The additive composition according to the invention is environmentally safe and suitable for storage and has excellent properties as a wetting agent and dispersant—in accordance with the phosphoric acid derivatives according to the invention as such. Additional components of the additive composition according to the invention may include solvents or lithium salts, for example.

In addition, the present invention relates to the use of the phosphoric acid ester derivatives described above and/or the additive composition described above as an additive, in particular as a wetting agent and dispersant in coatings, in particular paints, plastics, pigment pastes, sealing agents, ceramics, cosmetics, adhesives, casting compounds, spackling compounds, inks and printing inks.

In addition, the present invention relates to a mixture of solids which contains particles and/or fibers that have been treated with the phosphoric acid ester derivatives described above and/or the additive composition described above.

Finally, the invention also relates to paint or plastic, which contains the phosphoric acid ester derivatives described above and/or the additive composition described above.

The phosphoric acid ester derivatives according to the invention are used, for example, as aluminum passivators, dispersants, dispersion stabilizers or wetting agents and can be used, for example, in pigmented and/or filler-containing products, for example, pigment concentrates or pastes, coating compositions, sealing compositions, plastics, ceramics, cosmetics, adhesives, casting compounds, spackling compounds, inks and/or printing inks. Pigment concentrates that can be mixed with the corresponding paint systems to produce pigmented varnishes are preferred.

The aforementioned derivatives may thus be used, for example, in the production or processing of varnishes, inks and printing inks, for example, for ink jet printing, paper coating, leather and textile dyes, pastes, pigment concentrates, ceramics, adhesives and sealing compounds, casting compounds, plastics and cosmetic preparations, in particular when these contain solids, such as pigments and/or fillers. The aforementioned may also be used in the production or processing of molding compounds based on synthetic, semi-synthetic or natural macromolecular substances, such as polyvinyl chloride, saturated or unsaturated polyesters, polyurethanes, polystyrenes, polyacrylates, polyamides, epoxy resins, polyolefins, for example, polyethylene or polypropylene. These compounds may be used to produce, for example, casting compounds, PVC plastisols, gel coats, polymer concrete, circuit boards, industrial paints and varnishes, wood and furniture varnishes, automotive paints and enamels, antifouling marine paints, anticorrosion paints, can and coil coatings or as house and building paints.

The phosphoric acid ester derivatives according to the invention may be used not only in paint systems for pigmented paints but use in a wide range of formulations and/or products, such as resins, oils, fats, lubricants, rubber materials, sealing substances, printing inks, adhesives, waxes or coating compositions is also possible. The concentrates may also be used in formulations, which are prepared in the body care industry or in electrical applications in the electronics industry, in the shipbuilding industry, within the context of medical applications, in the building industry or in the automotive industry. Examples include electronic paper, such as the display in E-books, encapsulation of microelectronic chips and circuits, underwater boat membrane coatings, such as antifouling coatings, silicone tubes or lubricant additives for brake components.

The phosphoric acid ester derivatives according to the invention may advantageously also be used in the production of color filters for liquid crystal displays, liquid crystal screens, color resolution devices, sensors, plasma display screens, displays based on SED (surface conduction electron emitter display) and for MLCC (multilayer ceramic compounds). The MLCC technology is used in the production of microchips and circuit boards.

They may be used in cosmetic preparations to produce cosmetic preparations, for example, such as makeup, powder, lipstick, hair dye, creams, fingernail polish and sunscreen preparations. They may be in the usual forms, for example, as W/O or O/W emulsions, solutions, gels, creams, lotions or sprays. The compounds according to the invention may be used advantageously in dispersions intended for producing these preparations. They may contain the carrier media customary for these purposes in cosmetics, such as water, castor oils or silicone oils and solids, such as organic and inorganic pigments, such as titanium dioxide or iron oxide.

The application fields of NIP (non-impact printing), ink jet printing (on paper, film, ceramics, synthetic and natural woven fiber products), dispersing in ceramics (aqueous or anhydrous), dispersing in casting compounds may also be mentioned. The phosphoric acid ester derivatives according to the invention may also be incorporated in this form as such, i.e., without first being incorporated into a corresponding concentrate, in which the aforementioned formulations and application areas are used.

The phosphoric acid ester derivatives as well as the product that contains pigments and/or fillers is typically a varnish or a pigment concentrate for coating compositions. Ultimately, however, phosphoric acid derivatives may be used in any products that contain fillers and/or pigments.

The pigment concentrates are in particular compositions that contain, for example, organic solvents and at least one pigment in addition to the phosphoric acid ester derivatives according to the invention. These compositions in particular contain little or no organic polymers as binders. Such known binders are advantageously present in the corresponding final paint systems and are described below.

The typical organic solvents known to those skilled in the art and used in the field of the paint and varnish industry may be used as the organic solvents, such as aliphatic solvents, cycloaliphatic solvents, aromatic solvents, such as toluene, xylene, solvent naphtha, ethers, esters and/or ketones, for example, butyl glycol, butyl diglycol, butyl acetate, methyl isobutyl ketone, methyl ethyl ketone and/or solvents, such as methoxypropyl acetate, diacetone alcohol.

The pigments used may be the pigments known to those skilled in the art. Examples of suitable pigments include mono-, di-, tri- and polyazo pigments, oxazine, dioxazine, thiazine pigments, diketo pyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone, perylene pigments and other polycyclic carbonyl pigments, inorganic pigments, such as carbon black pigment and/or pigments based on carbon black, graphite, zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow or chromium titanium yellow), magnetic pigments based on pure iron, iron oxides and chromium oxides or mixed oxides, metal effect pigments of aluminum, zinc, copper or brass as well as pearlized pigments or fluorescent and phosphorescent luminous pigments. Other examples include nanoscale organic or inorganic solids with particle sizes of less than 100 nm in at least one dimension, such as certain types of carbon black or other allotropic forms of carbon, such as single-wall CNTs, multiwall CNTs and graphene. The particle size is determined, for example, by means of transmission electron microscopy, analytical ultracentrifugation or light scattering methods. Particles consisting of a metal oxide and/or hydroxide or a semimetal oxide and/or hydroxide as well as particles consisting of mixed metal oxides and/or hydroxides and/or semimetal oxides and/or hydroxides may also be mentioned. For example, the oxides and/or oxide hydroxides of aluminum, silicon, zinc, titanium, etc. may be used for the production of such extremely finely divided solids. The process for producing these oxidic and/or hydroxidic and/or oxide hydroxidic particles may involve a variety of methods, such as ion exchange processes, plasma processes, sol-gel process, precipitation, pulverization (for example, by milling) or flame hydrolysis. All the pigments mentioned above may also be present in a surface-modified form and may have basic, acidic or neutral groups at the surface.

If the respective products, in particular in the coating compositions contain fillers, then these are the fillers known to those skilled in the art for example. Examples of powdered fillers or fibrous fillers include those comprised of powdered or fibrous particles of aluminum oxide, aluminum hydroxide, silicon dioxide, kieselguhr, diatomaceous earth, quartz, silica gel, talc, kaolin, mica, perlite, feldspar, powdered slate, calcium sulfate, barium sulfate, calcium carbonate, calcite, dolomite, glass or carbon. The fibers that are used may be of an organic and/or inorganic type and may also be used as reinforcing materials. Additional examples of pigments or fillers can be found in U.S. Pat. No. 4,795,796 A, for example. Flame retardants may also be used if the compounds according to the invention are not already used in the conventional amounts of additives for this purpose, such as aluminum hydroxide or magnesium hydroxide and delustering agents, such as silicic acids may also be dispersed and stabilized especially well by using the wetting agents and dispersants according to the invention.

The phosphoric acid ester derivatives according to the invention are also suitable in particular for producing solid concentrates, such as pigment concentrates. To do so, the phosphoric acid ester derivatives according to the invention are placed in a carrier medium, such as organic solvents, plasticizers and/or water, and the solids to be dispersed are added while stirring. In addition, these concentrates may also contain binders and other additives. However, it is also possible in particular to produce stable binder-free pigments concentrates with the phosphoric acid ester derivatives according to the invention. It is also possible to produce flowable solid concentrates from pressed cakes of pigment using these phosphoric acid ester derivatives according to the invention. In this case, the compound according to the invention is mixed into the pressed cake which may still contain organic solvents, plasticizers and/or water, and the resulting mixture is dispersed. The solid concentrates produced in various ways may then be incorporated into different substrates, e.g., alkyd resins, polyester resins, acrylate resins, polyurethane resins or epoxy resins. However, pigments may also be dispersed directly in the phosphoric acid ester derivatives according to the invention without the use of solvents and then they are suitable in particular for pigmentation of thermoplastic and thermoset plastic formulations.

Depending on the field of use, the phosphoric acid ester derivatives according to the invention are used in amounts such that the wetting agent and the dispersant according to the invention are advantageously present in the product in the amount of 0.01 to 10 wt %, based on the total amount of the respective product, which is ultimately of interest for the further application. However, even larger amounts are also possible.

The wetting agent and dispersant according to the invention is used in an amount of preferably 0.5 to 100 wt % based on the solid to be dispersed, for example, the pigment. If solids that are difficult to disperse are used, the amount of wetting agent and dispersant according to the invention used may be much higher. The amount of dispersant depends in general on the surface area to be covered of the substance to be dispersed. Thus, for example, it may be important to know which pigment is involved. It can be stated in general that less dispersant is usually required for dispersing inorganic pigments than organic pigments because the latter usually have a higher specific surface area and therefore require a larger amount of dispersant. Typical doses of the wetting agent and dispersant for inorganic pigments are 1 to 20 wt %, for organic pigments 10 to 50 wt %, each based on the solid to be dispersed, in particular the pigment. In the case of very finely divided pigments (some carbon blacks, for example), it may be necessary to add amounts of 30 to 90% or even more. The gloss and transparency of the coating compositions or the degree of floating, for example, may be used as criteria for adequate pigment stabilization. Dispersion of the solids may take place as a single paste preparation or as a mixture paste preparation with multiple pigments simultaneously, with the best results usually being achieved with individual grinds. When using mixtures of different solids, increased agglomeration may occur in the liquid phase due to the opposing charges on the surfaces of the solids. In these cases a uniform charge, in most cases a positive charge of all particles can be achieved when using the phosphoric acid ester derivatives according to the invention, and therefore instabilities due to differences in charge can be prevented. These dispersants achieve their optimal effect when added to the ground material, in particular when the solid to be dispersed is mixed first only with the additive and then, if necessary, with the solvents ("premix") because then the additive can preferably be adsorbed onto the solid surface without having to be in competition with the binder polymers. In practice, however, this procedure is necessary only in exceptional cases. If needed, the phosphoric acid ester derivatives according to the invention may also be added subsequently (as so-called "post-additives"), for example, to solve flocculation or floating problems in the case of a batch that has been converted completely to a varnish. In this case, however, higher additive doses are usually necessary.

The products, in particular the coating compositions and/or varnishes, in which the phosphoric acid ester derivatives according to the invention should ultimately manifest their effects, may also contain an organic polymer as a binder. Those skilled in the art are familiar with such binders. This at least one binder may be introduced through a varnish system, for example, which is mixed with a pigment concentrate containing the phosphoric acid ester derivatives according to the invention, for example, so that the product in question is a pigmented varnish. However, other pigmented and/or filler-containing products are also possible, for example, plastics, sealing compounds and other products, with which those skilled in the art are familiar based on an organic polymer matrix. A product may be regarded as a system containing a polymer resin and/or an organic polymer as binder, so the product is capable of forming a solid organic polymer matrix (for example, a coating composition) under suitable curing conditions. A product is also a system capable of forming such an organic polymer matrix (for example, a pigment concentrate) simply by being mixed with a component containing a binder. For example, alkyd resins, polyester resins, acrylate resins, polyurethane resins, cellulose nitrates, cellulose acetobutyrates, melamines, chlorinated rubber and/or epoxy resins may also be used, but not just those with which those skilled in the art are familiar. Examples of coatings based on water include cathodic or anodic electrodip coatings, for example, for carrier bodies. Other examples include plasters, silicate dyes, disperse dyes, water-based varnishes using water-dilutable alkyds, alkyd emulsions, hybrid systems, two-component systems, polyurethane and acrylate dispersions.

Both single-component systems as well as two-component systems are possible, but in the latter case polyisocyanates, melamine resins and/or polyamide resins are usually also present as the typical crosslinking agent, with which those skilled in the art are familiar, in a second component. Product systems, in particular coating compositions, that contain an acrylate resin as the binder are preferred. Another variant is a two-component (2C) coating composition and/or a two-component varnish, which contains an epoxy resin in the binder component and the polyamide resin in the crosslinking agent component.

The coating compositions that are preferred as the products may be water-based or solvent-based. It is understood that in the case of water-based products, the coating composition will contain mainly water as the solvent. A water-based coating composition in particular will contain no more than 10 wt % organic solvent, based on the total amount of solvent present in the coating composition. A coating composition containing no more than 5 wt %, preferably no more than 2 wt % water, based on the total amount of solvents, is considered to be solvent-based.

For example, photoinitiators, foam suppressants, wetting agents, film-forming additives, such as cellulose derivatives (for example, cellulose nitrates, cellulose acetates, cellulose acetobutyrate), reactive diluents, flow control agents, dispersants and/or rheology-controlling additives may be used as the additional product components, for example.

The pigment concentrates and coating composition preferred as products according to the invention are produced by methods with which those skilled in the art are familiar. The known methods are used, such as, for example, stepwise addition, while stirring and mixing the ingredients of the coating composition in conventional mixing equipment, such as stirred vessels or dissolvers.

Coatings and/or varnish layers can be produced by using the preferred pigment concentrates and coatings compositions. The coating is performed by using the application techniques with which those skilled in the art are familiar, applying the coating to a substrate and then using curing methods.

The coatings are applied, for example, by the known spray, painting or rolling application or by pouring, impregnation or dipping methods. After application of the coating composition to a substrate, it is cured and/or dried by conventional methods. For example, the applied coating composition may be curable in a physically drying method, thermally and/or by using actinic radiation (radiation curing), preferably UV radiation and electron radiation. The thermal curing may take place, for example, in the range of approx. 10° C. to approx. 400° C., depending on the type of coating composition and/or substrate. The duration of the curing is individual and/or depends on the type of curing method (thermal or actinic), the type of coating composition used and/or the substrates. The substrate may be in motion or at rest.

In addition to the application as a dispersant and/or coating agent for powdered and fibrous solids as described above, the phosphoric acid ester derivatives according to the invention may also be used as viscosity reducing agents and as compatibilizers in synthetic resins. Examples of such synthetic resins include the so-called "sheet molding compounds" (SMC) and "bulk molding compounds" (BMC) which consist of unsaturated polyester resins with a high filler and fiber content. Their production and processing are described in U.S. Pat. No. 4,777,195 A, for example. One problem with SMC and BMC synthetic resin mixtures is that polystyrene (PS) is often added to the formulation to reduce shrinkage during the processing operation. PS is not compatible with the unsaturated polyester resins that are used, and separation of the components occurs. When using PS-filled SMC or BMC mixtures, the phosphoric acid ester derivatives according to the invention may lead to a compatibilization effect between PS and the unsaturated polyester resin because of their good dispersion qualities, thus increasing the storage stability and processing reliability of such mixtures.

Phase mediating effects may also be achieved by means of the phosphoric acid ester derivatives according to the invention in incompatible polyol mixtures, polyol isocyanate mixtures or polyol blowing agent mixtures, for example (e.g., used in polyurethane production).

The invention will also be explained below on the basis of examples.

EXAMPLES

The molecular weights given here are the number-average value in the case of substances that do not have a uniform molecular weight. The molecular weights, i.e., the number-average molecular weights Mn are determined by end group determination in the presence of titratable hydroxyl or amino groups, by determination of the OH number and/or the amine number. In the case of compounds in which the number of terminal groups cannot be determined, the number-average molecular weight is determined by gel permeation chromatography against a polystyrene standards.

Unless otherwise indicated, the amounts given in parts refer to parts by weight and amounts given in percentages are weight percent.

The free NCO content of the polyisocyanates used here as well as the course of the reaction of the NCO additions is determined according to EN ISO 9369 by fully reaction with butylamine and then titration of the amine excess. These methods are also described by Saul Patai "The Chemistry of Cyanates and Their Thio Derivatives," part 1, chapter 5, 1977.

Production of Polyether Polyester Y1, Mn 780

350 g MPEG 350-caprolactone and 1 g DBTL (dibutyltin dilaurate) (methoxypolyethylene glycol, Mn 350), 434 g are reacted at 160° C. until reaching a solids content of >95%. The OH number of the reaction product was 72 mg KOH/g.

Production of a Siloxane-Containing ε-Caprolactone Polyester Y2, Mn 2800

35 g of an α,ω-hydroxyalkyl-functional dimethylpolysiloxane with a total molecular weight of approx. 900 g/mol were reacted with 75 g ε-caprolactone. To do so, the mixture was allowed to reactor for about 8 hours in an N2 atmosphere at 160° C. with the addition of 0.035 g DBTL. The reaction is ended when the nonvolatile content is >98%. The α,ω-hydroxyalkyl-functional dimethylpolysiloxane as the initiator alcohol is obtained by methods with which those skilled in the art are familiar, i.e., by adding suitable unsaturated alcohols (e.g., the allyl alcohol used in this example) to dimethylpolysiloxanes having terminals silane units.

The additional hydroxy-functional polyesters used as Y—OH are synthesized by similar methods.

General Synthesis Procedure for the Monoadducts:

In a four-neck flask equipped with a stirrer, thermometer, dropping funnel, reflux condenser and nitrogen inlet line, 430 g Desmodur T 100 (approx. 100% toluene 2,4-diisocyanate, NCO content=48.8) and 7 g benzoyl chloride are placed and mixed thoroughly. X g of the alcohol component which is anhydrous and is free of alkali in the case of polyethers is added slowly so that the temperature does not exceed 55° C. After this addition, the mixture is stirred for 3 hours more at 55° C. The excess TDI is removed from the reaction mixture by thin-film evaporator at 150° C. The remaining TDI content is <1%.

| Mono-adduct | Alcohol component | Amount X in (g) |
|---|---|---|
| M1 | Butanol-initiated PO polyether Mn 800, OH number: 70 mg KOH/g | 800 |
| M2 | MPEG 350, OH number: 162 mg KOH/g | 350 |
| M3 | Butanol-initiated EO/PO polyether (EO:PO 1:1) Mn 2240, OH number: 25 mg KOH/g | 2240 |
| M4 | Polyester Y1, OH number: 72 mg KOH/g | 780 |
| M5 | Hexadecanol-initiated monohydroxy-functional ε-caprolactone polyester, Mn 600 | 600 |
| M6 | Hexadecanol-initiated monohydroxy-functional ε-caprolactone polyester, Mn 1200 | 1200 |
| M7 | MPEG 500 = methoxypolyethylene glycol, Mn 500 | 500 |
| M8 | Butanol-initiated EO/PO polyether (EO:PO 1:1) Mn 1100 | 1100 |
| M9 | B11/50 = butanol-initiated EO/PO polyether (EO:PO 1:1) Mn 1700 | 1700 |
| M10 | Butanol-initiated EO/PO polyether (EO:PO 1:1) Mn 2000 | 2000 |
| M11 | Butanol-initiated EO/PO polyether (EO:PO 1:1) Mn 3100 | 3100 |
| M12 | Butanol-initiated EO/PO polyether (EO:PO 1:1) Mn 4800 | 4800 |
| M13 | Hydroxyethyl acrylate initiated ε-caprolactone polyester, Mn 1200 | 1200 |
| M14 | Monohydroxy-functional hydroxypropyl polydimethylsiloxane with butyl end group, Mn 1200 | 1200 |
| M15 | Methanol-initiated EO/PO polyether (EO:PO 3:1), Mn 1400 | 1400 |
| M16 | MPEG 500-initiated ε-caprolactone polyester Mn 900 | 900 |
| M17 | Isodecanol-initiated ε-caprolactone polyester Mn 700 | 700 |
| M18 | Isodecanol-initiated ε-caprolactone polyester Mn 1000 | 1000 |
| M19 | Monophenyl glycol-initiated ε-caprolactone polyester Mn 1200 | 1200 |
| M20 | n-Butanol-initiated ε-caprolactone polyester, Mn = 600 | 600 |
| M21 | n-Butanol-initiated ε-caprolactone polyester, Mn = 1200 | 1200 |
| M22 | Butanol-initiated PO polyether, Mn 1100 | 1100 |
| M23 | Isodecanol-initiated polyester from ε-caprolactone and δ-valerolactone in a molar ratio 3:1, Mn = 2000 | 2000 |
| M24 | B11/50-initiated ε-caprolactone polyester, average molecular weight Mn = 2000 | 2000 |
| M25 | MPEG 350-initiated ε-caprolactone polyester Mn 900 | 900 |
| M26 | MPEG 350-initiated polyester with ε-caprolactone and δ-valerolactone in a molar ratio 3:1, Mn = 950 | 950 |
| M27 | MPEG 500-initiated polyester with ε-caprolactone and δ-valerolactone in a molar ratio 3:1, Mn = 1100 | 1100 |
| M28 | MPEG 750-initiated polyester with ε-caprolactone and δ-valerolactone in a molar ratio 3:1, Mn = 1400 | 1400 |
| M29 | MPEG 750 | 750 |
| M30 | ε-Caprolactone polyester Mn 1600, initiated with a methanol-initiated EO/PO polyether (EO:PO 3:1), Mn 1400 | 1600 |
| M31 | Butanol-initiated EO/PO polyether (EO:PO 1:1) Mn 3170 | 3170 |
| M32 | Butanol-initiated EO/PO polyether (EO:PO 1:1) Mn 2540 | 2540 |

| Mono-adduct | Alcohol component | Amount X in (g) |
|---|---|---|
| M33 | Butanol-initiated PO polyether, Mn 2240 | 2240 |
| M34 | Butanol-initiated butylene oxide polyether, Mn 960 | 960 |
| M35 | α,ω-Dihydroxy-functional hydroxypropyl polydimethylsiloxane, Mn 1800 | 1800 |
| M36 | Y2, dihydroxy-functional ε-caprolactone polyester Mn 2800, initiated with an α,ω-dihydroxy-functional hydroxypropyl polydimethylsiloxane, Mn 900 | 2800 |
| M37 | Oleyl alcohol | 268 |
| M38 | Monophenyl glycol | 138 |
| M39 | Isotridecyl alcohol | 200 |
| M40 | n-Decanol | 158 |
| M41 | Isodecanol | 158 |
| M42 | Benzyl alcohol | 108 |
| M43 | Cyclohexanol | 100 |
| M44 | Isobutanol | 74 |
| M45 | Polyethylene glycol (dihydroxy-functional), Mn 600 | 300 |
| M46 | Polyethylene glycol (dihydroxy-functional), Mn 1000 | 500 |
| M47 | Dipropylene glycol monomethyl ether | 148 |
| M48 | Butyl triglycol | 206 |

General Procedure for Reacting the Monoadducts with Amines and Polyphosphoric Acid to Form Monoadduct Ureas In a four-neck flask equipped with a stirrer, thermometer, dropping funnel, reflux condenser and nitrogen inlet line, x g monoadduct is placed and y g amino alcohol is added by drops while stirring for 1 hour. The reaction temperature should not exceed 50° C. in this process. After 1 hour the temperature is raised to 80° C. and z g polyphosphoric acid is added. The reaction is ended after 3 hours at 80° C. MPA may optionally be used for dilution during or after the reaction.

| Example | Monoadduct | Amino alcohol | Polyphosphoric acid in (g) |
|---|---|---|---|
| P1 | 100 g M1 | 6.9 g EA | 12.7 |
| P2 | 100 g M2 | 9.9 g EA | 16.4 |
| P3 | 852 g M25 | 61 g EA | 85 |
| P4 | 852 g M25 | 105 g DEA | 170 |
| P5 | 1150 g M26 | 61 g EA | 85 |
| P6 | 1150 g M26 | 105 g DEA | 170 |
| P7 | 1150 g M26 | 105 g AEE | 85 |
| P8 | 1072 g M16 | 61 g EA | 85 |
| P9 | 1072 g M16 | 105 g DEA | 170 |
| P10 | 1072 g M16 | 105 g DEA | 85 |
| P11 | 1274 g M27 | 105 g DEA | 170 |
| P12 | 1574 g M15 | 105 g DEA | 170 |
| P13 | 1574 g M28 | 105 g DEA | 170 |
| P14 | 1274 g M8 | 105 g DEA | 170 |
| P15 | 974 g M1 | 105 g DEA | 170 |
| P16 | 924 g M29 | 105 g DEA | 170 |
| P17 | 1774 g M30 | 105 g DEA | 170 |
| P18 | 4974 g M12 | 105 g DEA | 170 |
| P19 | 4974 g M12 | 105 g DEA | 85 |
| P20 | 4974 g M12 | 144 g TEA | 170 |
| P21 | 3344 g M31 | 105 g DEA | 170 |
| P22 | 2714 g M32 | 105 g DEA | 170 |
| P23 | 2414 g M33 | 105 g DEA | 170 |
| P24 | 1134 g M34 | 105 g DEA | 170 |
| P25 | 2414 g M3 | 105 g DEA | 170 |
| P26 | 954 g M4 | 105 g DEA | 170 |
| P27 | 770 g M5 | 105 g DEA | 170 |
| P28 | 1370 g M6 | 105 g DEA | 170 |
| P29 | 670 g M7 | 105 g DEA | 170 |
| P30 | 1170 g M8 | 61 g EA | 85 |
| P31 | 1870 g M9 | 105 g DEA | 170 |
| P32 | 2170 g M10 | 105 g DEA | 170 |
| P33 | 3270 g M11 | 105 g DEA | 170 |
| P34 | 5000 g M12 | 61 g EA | 85 |
| P35 | 1370 g M13 | 105 g DEA | 170 |
| P36 | 1370 g M14 | 105 g DEA | 170 |
| P37 | 870 g M17 | 105 g DEA | 170 |
| P38 | 1170 g M18 | 105 g DEA | 170 |
| P39 | 1370 g M19 | 105 g DEA | 170 |
| P40 | 770 g M20 | 105 g DEA | 170 |
| P41 | 1370 g M21 | 105 g DEA | 170 |
| P42 | 1270 g M22 | 105 g DEA | 170 |
| P43 | 2170 g M23 | 105 g DEA | 170 |
| P44 | 2170 g M24 | 105 g DEA | 170 |
| P45 | 2148 g M35 | 105 g DEA | 170 |
| P46 | 3148 g M36 | 105 g DBA | 170 |
| P47 | 442 g M37 | 61 g EA | 85 |
| P48 | 312 g M38 | 105 g DEA | 170 |
| P49 | 374 g M39 | 61 g EA | 85 |
| P50 | 332 g M40 | 61 g EA | 85 |
| P51 | 332 g M41 | 61 g EA | 85 |
| P51 | 282 g M42 | 61 g EA | 85 |
| P53 | 274 g M43 | 61 g EA | 85 |
| P54 | 248 g M44 | 105 g DEA | 170 |
| P55 | 474 g M45 | 105 g DEA | 170 |
| P56 | 674 g M46 | 105 g DEA | 170 |
| P57 | 332 g M47 | 105 g DEA | 170 |
| P58 | 380 g M48 | 105 g DEA | 170 |

EA = ethanolamine; DEA = diethanolamine; AEE = 2-(2-aminoethoxy)ethanol; TEA = triethanolamine Production of a Comparative Example PX1 not According to the Invention 950 g of an MPEG 350-initiated polyester of ε-caprolactone and δ-valerolactone in a molar ratio of 3:1, Mn=950 and 85 g polyphosphoric acid are stirred for 3 hours at 80° C.

Production of a Comparative Example PX2 not According to the Invention 950 g of a butanol-initiated EO/PO polyether (EO:PO 1:1), Mn 4800 and 85 g polyphosphoric acid are stirred for 3 hours at 80° C.

General Procedure for Forming a Salt

The monoadduct urea is stirred into 40 g MPA and 40 g butyl glycol with x g salinization reagent for 1 hour at 60° C. in a four-neck flask equipped with a stirrer, thermometer, dropping funnel, reflux condenser and nitrogen inlet line.

| Example | Compound used | Salinization reagent |
|---------|---------------|----------------------|
| S1  | 1377 g P9  | 234 g DEEA |
| S2  | 1377 g P9  | 178 g DMEA |
| S3  | 1377 g P9  | 346 g N,N-dibutylethanolamine |
| S4  | 1277 g P10 | 117 g DEEA |
| S5  | 1480 g P11 | 149 g TEA |
| S6  | 1570 g P14 | 1400 g copolymer 1 |
| S7  | 1280 g P15 | 1600 g copolymer 2 |
| S8  | 5280 g P18 | 1400 g copolymer 1 |
| S9  | 5280 g P18 | 1600 g copolymer 2 |
| S10 | 5180 g P19 | 700 g copolymer 1 |
| S11 | 5180 g P19 | 800 g copolymer 2 |
| S20 | 685 g P47  | 700 g copolymer 1 |
| S21 | 520 g P49  | 700 g copolymer 1 |
| S22 | 2445 g P43 | 1400 g copolymer 1 |
| S23 | 2445 g P43 | 700 g copolymer 1 |

DEEA = N,N-diethylethanolamine; DMEA = N,N-dimethylethanolamine

Copolymer 1 (Basic GTP Block Copolymer)

In a three-neck flask equipped with a stirrer, reflux condenser and gas inlet, 69.70 g MPA is placed at 20° C. under a stream of nitrogen and mixed with 7.70 g butyl methacrylate. Then 3.75 g 1-trimethylsiloxy-1-methoxy-2-methylpropene and 0.375 g tetrabutylammonium m-chlorobenzoate are added by syringe through a septum. Within 30 minutes, 60.00 g butyl methacrylate is added. The reaction temperature then rises to 40° C. and is kept at this level by cooling. After adding butyl methacrylate, 32.80 g N,N-dimethylaminoethyl methacrylate is added within 20 minutes while cooling to ensure that the temperature does not rise above 40° C. After stirring for 30 minutes, 3 mL ethanol is added. The monomers were reacted completely (residual monomer content determined by HPLC). Product Mn=9100 g/mol according to GPC.

Copolymer 2 (Basic NMP Block Copolymer)

In a three-neck flask equipped with a stirrer, reflux condenser and a gas inlet, 47.2 g MPA and 3.81 g 2-[N-tert-butyl-N-[1-diethylphosphono-(2,2-dimethylpropyl)]nitroxy]-2-methylpropanoic acid plus 46.00 g butyl acrylate are placed in a three-neck round-bottom flask under a stream of nitrogen and heated to 120° C. The mixture is stirred for 2.5 hours more at 120° C. Next 21.00 g N,N-dimethylaminoethyl methacrylate is added at a rate of 2 mL/min. Next the mixture is stirred for 6 more hours at 120° C., after which the conversion is more than 98% (residual monomer content determined by HPLC); product Mn=3000 g/mol according to GPC.

c) Technical Applications Testing

Use of the polymers according to the invention as wetting agents and dispersants for production of pigment concentrates and use thereof in coating systems Starting Materials

| Uralac SN 831 | Polyester resin, manufacturer DSM Resins |
|---|---|
| Cymel 303 | Melamine formaldehyde resin, manufacturer Cytec Industries |
| Dynapol catalyst 1203 | Catalyst, manufacturer Evonik Degussa |
| Ti pure R960 | Titanium dioxide pigment, manufacturer Du Pontrosil R972 |
| Aerosil R972 | Hydrophobic pyrogenic silicic acid, manufacturer Degussa |
| BYK 057 | Silicone-free polymer foam suppressant from Byk-Chemie |
| BYK 355 | Acrylate flow additive, manufacturer Byk-Chemie |
| Solvesso 150 ND, Solvesso 100 | Aromatic solvent from ExxonMobil |
| MPA | 1-Methoxy-2-propyl acetate |

Working Procedure

Production of the Coatings

Grinding Conditions:

Device: Lau paint shaker DAS H[/A] 200-K

Grinding time: 60 minutes, normal speed, maximum cooling

Ratio of ground material to glass beads (1 mm diameter): 1:1 (parts by weight)

Composition of the Pigment Concentrates:

|  | Ti pure R960 | Special black 4 |
|---|---|---|
| Uralac SN831 | 26.2 | 44.0 |
| Additive | 1.7 | 3.6 |
| MPA | 5.0 | 5.0 |
| Solvesso 150ND | 11.2 | 17.5 |
| Aerosil R972 | 0.6 | 0.3 |
| BYK-057 | 0.3 |  |
| Ti pure R960 | 55.0 |  |
| Special black 4 |  | 12.0 |

Special black 4: pigment carbon black from Evonik

Production of the Test Formulations

Composition of the Clear Coating

| Clear coating | |
|---|---|
| Uralac SN 831 | 64.0 |
| Cymel 303 | 13.8 |
| Dynapol catalyst 1203 | 4.9 |
| BYK-057 | 0.4 |
| BYK-355 | 1.1 |
| Solvesso 150 ND | 10.5 |
| MPA | 5.3 |
| | 100.0 |

Composition of the Test Formulations

| | White:black 97:3 |
|---|---|
| Clear coating | 19.8 |
| Ti pure R960 | 26.5 |
| Special black 4 | 3.7 |
| | 50.0 |

Following production, the viscosity of the test formulations was adjusted using Solvesso 150ND to 90-110 sec (DIN 4 flow cup, 23° C.).

A portion of the test formulation was stored for 1 week at 50° C.

Application of the Test Formulation

The test formulations were applied to substrates on the date of their production under the following conditions:

Substrates: Alcan aluminum sheets, precoated with a

Doctor application: 80 μm (wet)

Oven temperature: 320° C.

Baking time: 30 s

Max. metal temperature: 235° C.

Dry film layer thickness: 18-20 μm

The floating and flocculation properties were evaluated as follows.

The respective test formulation was divided into two portions.

The first portion of the respective test formulation was stirred for 1 minute with a toothed disk at 6000 revolutions per minute and then applied directly to the right half of the substrate surface. At the same time, the second portion of the respective test formulation was applied to the left half of the substrate surface without stirring it first.

Rub-Out Test

Immediately after application, the freshly prepared coating layers were subjected to a rub-out test on both halves of the substrate surface.

To do so, a few spots in the fresh coating layers were rubbed mechanically after application and then the change in hue caused by rubbing (rub-out effect) in comparison with the coating that had not been rubbed was measured. Causes of the rub-out effect include, for example, flocculation and/or floating of pigments. If there are pigment flocculates, these are destroyed by the shearing effect in rubbing, resulting in the hue that was originally desired. The rub-out effect can be minimized by suitable dispersants and is thus a measure of the efficacy of a dispersant.

Colorimetric Measurements
Device: Color guide, BYK Gardner
Type of light: Standard light D65 (daylight)
Measurement field: 10°
Measurement geometry: d/8° spin (diffuse lighting, observation angle 8°)
Number of measurements: n=3

The colorimetric results are summarized in the following table. The EE value obtained for a formulation represents the difference in color between the rubbed spots and the unrubbed spots in the coating (rub-out effect).

ΔE 1=ΔE not stirred
ΔE 2=ΔE stirred
ΔE 3=ΔE not stirred/stirred

|  | ΔE 1 | ΔE 2 | ΔE 3 | Gloss 60° | Viscosity of the black pigment concentrate |
|---|---|---|---|---|---|
| After grinding | | | | | |
| S6 | 0.65 | 0.59 | 0.06 | 85 | Low |
| S7 | 0.64 | 0.58 | 0.07 | 85 | Low |
| S8 | 0.59 | 0.57 | 0.05 | 86 | Low |
| S9 | 0.54 | 0.49 | 0.05 | 86 | Low |
| S20 | 0.69 | 0.62 | 0.08 | 86 | Low |
| S22 | 0.48 | 0.55 | 0.04 | 90 | Low |
| P19 | 0.71 | 0.75 | 0.08 | 84 | Low |
| P20 | 0.65 | 0.63 | 0.06 | 85 | Low |
| PX2 (not according to the invention) | 0.98 | 1.02 | 0.18 | 79 | High |
| After 1 week of storage at 50° C. | | | | | |
| S6 | 0.64 | 0.58 | 0.06 | 86 | Low |
| S7 | 0.62 | 0.57 | 0.06 | 84 | Low |
| S8 | 0.58 | 0.59 | 0.05 | 85 | Low |
| S9 | 0.52 | 0.47 | 0.05 | 87 | Low |
| S20 | 0.68 | 0.61 | 0.08 | 87 | Low |
| S22 | 0.52 | 0.54 | 0.05 | 90 | Low |
| P19 | 0.70 | 0.74 | 0.07 | 84 | Low |
| P20 | 0.65 | 0.62 | 0.06 | 85 | Low |
| PX2 | 1.23 | 1.22 | 0.26 | 76 | High |

Formulation: Paraloid B 66 (Thermoplastic Acrylate from Dow Chemicals)
Ground Material:

| Paraloid B 66 (50% in xylene) | 25.00 |
|---|---|
| DIDP | 2.00 |
| Xylene | 3.5 |
| MPA | 2.50 |
| Additive | 1.5 |
| Aerosil R 972 | 0.50 |
| Pigment | 65.00 |
| Total | 100.00 |

Paraloid B 66 = thermoplastic acrylate resin from Dow Chemicals
DIDP = diisodecyl phthalate Coating Material:

| Ground paste | 38.50 |
|---|---|
| Paraloid B 66 | 50.00 |
| MPA | 3.40 |
| Xylene | 8.00 |
| BYK-306 | 0.10 |

BYK-306: silicone additive from Byk-Chemie

Paraloid B 66 Results

| | Pigments | | | | | | | | |
|---|---|---|---|---|---|---|---|---|---|
| | Kronos 2310 | | | Tioxide TR 92 | | | Ti-Pure R 960 | | |
| Additives | Viscosity | ΔE | Gloss | Viscosity | ΔE | Gloss | Viscosity | ΔE | Gloss |
| PX1 | 3 | 4.5 | 85 | 4 | 2.5 | 83 | 4 | 3.9 | 73 |
| PX2 | 4 | 5.1 | 81 | 5 | 3.1 | 79 | 5 | 5.7 | 63 |
| P6 | 2 | 3.3 | 91 | 3 | 1.1 | 86 | 2 | 2.5 | 80 |
| P18 | 2 | 2.5 | 95 | 3 | 0.5 | 88 | 1 | 2.1 | 83 |

Kronos 2310: Titanium dioxide pigment with a basic surface
Tioxide TR 92: Titanium dioxide pigment with a basic surface
Ti-Pure R 960: Titanium dioxide pigment with an acidic surface
Viscosity: 1-5, 1 = low, 5 = high Formulation: Macrynal SM 510 (2-K acryl)
Ground Material:

| Macrynal SM 510 | 22.22 |
|---|---|
| MPA | 2.00 |
| Solvesso 100 | 2.00 |
| Xylene | 3.00 |
| Butyl acetate | 3.5 |
| BYK-066 N | 0.30 |
| Additive | 1.5 |
| Aerosil R 972 | 0.50 |
| Pigment | 65.00 |
| Total | 100.00 |

Macrynal SM 510 = polyacrylate resin from Cytec
BYK-066 N: silicone foam suppressant from Byk-Chemie Coating Material:

| Ground paste | 38.50 |
|---|---|
| Macrynal SM 510 | 45.00 |
| MPA | 1.00 |
| Solvesso 100 | 7.00 |
| Xylene | 1.40 |
| Butyl acetate | 7.00 |
| BYK-306 | 0.10 |

BYK-306: silicone-containing surface additive from Byk-Chemie

Curing Agent Solution Stock to Curing Agent: 2:1

| Desmodur N 75 | 25.0 |
|---|---|
| Butyl acetate | 8.70 |
| Solvesso 100 | 8.80 |

-continued

| | |
|---|---|
| MPA | 2.50 |
| Xylene | 5.00 |
| Total | 50.00 |

Desmodur N 75: aliphatic polyisocyanate (HDI biuret) from Bayer, 75% in MPA

Results: Macrynal SM 510

| | Pigments | | | | | | | |
|---|---|---|---|---|---|---|---|---|
| | Kronos 2310 | | | Tioxide TR 92 | | | Ti-Pure R 960 | |
| Additive | Viscosity | ΔE | Gloss | Viscosity | ΔE | Gloss | Viscosity | ΔE | Gloss |
| PX1 | 5 | 1.2 | 85 | 5 | 1.1 | 84 | 5 | 1.6 | 86 |
| PX2 | 5 | 1.3 | 84 | 5 | 1.6 | 81 | 5 | 5.7 | 82 |
| P6 | 2 | 0.6 | 95 | 1 | 0.3 | 90 | 2 | 0.7 | 91 |
| P18 | 1 | 0.5 | 91 | 2 | 0.6 | 93 | 1 | 0.5 | 95 |
| S6 | 1 | 0.5 | 94 | 1 | 0.5 | 92 | 2 | 0.7 | 90 |
| S9 | 1 | 0.4 | 92 | 1 | 0.6 | 92 | 1 | 0.5 | 94 |

Formulation: Setalux 1756 VV 65

Ground Material:

| | |
|---|---|
| Setalux 1756 VV-65 | 22.22 |
| Additive | 1.5 |
| Solvesso 100 | 5.5 |
| Xylene | 5.28 |
| Aerosil R 972 | 0.50 |
| Pigment | 65.00 |
| Total | 100.00 |

Setalux 1756 VV-65: hydroxyacrylate copolymer from Nuplex, 50% in xylene/butanol Coating Material:

| | |
|---|---|
| Ground paste | 38.50 |
| Setalux 1756 VV-65 | 40.00 |
| Setamine US 138-BB 70 | 16.00 |
| Solvesso 100 | 3.00 |
| Xylene | 2.30 |
| BYK-310 | 0.20 |
| Total | 100.00 |

Setamine US 138-BB 70: melamine resin from Nuplex
BYK-310: polyester-modified polydimethylsiloxane from Byk-Chemie Pigment/binder: 0.8:1 in the coating Mixture: 29.5 g of white coating+0.5 g of black paste Baking conditions: venting for 10 minutes then 20 minutes at 140° C.

Results: Setalux 1756 VV 65

| | Pigments | | | | | | | |
|---|---|---|---|---|---|---|---|---|
| | Kronos 2310 | | | Tioxide TR 92 | | | Ti-Pure R 960 | |
| Additives | Viscosity | ΔE | Gloss | Viscosity | ΔE | Gloss | Viscosity | ΔE | Gloss |
| PX1 | 5 | 1.2 | 89 | 4 | 1.3 | 89 | 5 | 0.9 | 88 |
| PX2 | 5 | 1.5 | 84 | 5 | 1.7 | 88 | 5 | 1.6 | 84 |
| P6 | 1 | 0.6 | 95 | 1 | 0.3 | 92 | 2 | 0.5 | 93 |
| P18 | 1 | 0.3 | 98 | 1 | 0.6 | 98 | 1 | 0.3 | 96 |
| P22 | 1 | 0.7 | 95 | 1 | 0.3 | 92 | 2 | 0.3 | 94 |
| S6 | 1 | 0.6 | 91 | 2 | 0.9 | 90 | 2 | 0.4 | 93 |
| S9 | 1 | 0.8 | 94 | 1 | 0.8 | 91 | 1 | 0.3 | 94 |

Additional Results with Setalux 1756 VV 65

| | Pigment Ti-Pure R 960 | | |
|---|---|---|---|
| Additives | Viscosity | ΔE | Gloss |
| P26 | 1 | 0.6 | 95 |
| P28 | 1 | 0.5 | 94 |
| P37 | 1 | 0.7 | 92 |
| P38 | 1 | 0.4 | 96 |
| P39 | 1 | 0.7 | 95 |
| P41 | 1 | 0.6 | 92 |
| P43 | 2 | 0.8 | 92 |
| P47 | 3 | 0.9 | 90 |
| S22 | 1 | 0.6 | 94 |

Conclusion for the Examples

The quantity of the phosphoric acid ester derivatives according to the invention, which was particularly high in general, is apparent with regard to gloss, viscosity and rub-out effect. The good universality with respect to acidic and basic pigment particles to be dispersed should be emphasized in particular (see also "Results with Paraloid B 66"—according to the table above).

The invention claimed is:

1. A phosphoric acid ester derivative according to formula (I)

$$Y(-O-CO-NH-R^1-NH-CO-X-Z^1)_q \quad (I)$$

or mixtures thereof,
where
Y is the same or different and is represented by a branched or unbranched, saturated or unsaturated organic radical containing 1 to 1000 carbon atoms,
q may be the same or different and is represented by an integer from 1 to 10,
$R^1$ may be the same or different and is represented by a hydrocarbon radical containing 6 to 20 carbon atoms,
X may be the same or different and is represented by NH and/or $NZ^2$
wherein
$Z^2$ may be the same or different and is represented by a branched or unbranched, saturated or unsaturated organic radical,
$Z^1$ is the same or different and is represented by formula (II)

$$R^2-O-PO(OR^3)_n(OH)_{2-n} \quad (II)$$

where
$R^2$ is the same or different and is represented by a saturated or unsaturated, branched or unbranched organic radical containing at least two carbon atoms, characterized in that n is 1 and $R^3$ is represented by $R^2-X-CO-NH-R^1-NH-CO-O-Y$.

2. The phosphoric acid ester derivative according to claim 1, characterized in that q is the same or different and is represented by an integer from 1 to 5.

3. The phosphoric acid ester derivative according to claim 1, characterized in that Y contains at least one polyether radical, polyester radical, hydrocarbon radical and/or polysiloxane radical.

4. The phosphoric acid ester derivative according to claim 1, characterized in that Y contains a total of 1 to 450 ether oxygen atoms.

5. The phosphoric acid ester derivative according to claim 1, characterized in that Y contains a total of 3 to 400 ether oxygen atoms, at least 50 mol % of the ether oxygen atoms being present in ethylene oxide and/or propylene oxide structural units.

6. The phosphoric acid ester derivative according to claim 1, characterized in that $R^1$ is a tolyl group.

7. The phosphoric acid ester derivative according to claim 1, characterized in that $R^1$ is the hydrocarbon radical of a diisocyanate containing two differently reactive NCO groups.

8. The phosphoric acid ester derivative according to claim 1, which is present in salinized or partially salinized form.

9. A process comprising adding the phosphoric acid ester derivative according to claim 1 to coatings, varnish coatings, plastics, pigment pastes, sealing compounds, ceramics, cosmetics, adhesives, casting compounds, spackling compounds, inks and printing inks.

10. A solid mixture containing particles and/or fibers that have been treated with the phosphoric acid ester derivative according to claim 1.

11. A coating and/or plastic containing the phosphoric acid ester derivative according to claim 1.

12. The phosphoric acid ester derivative according to claim 1, wherein $R^1$ is at least one of an arylene group, a branched or unbranched alkylarylene group, or an acyclic, cyclic, branched or unbranched alkylene group.

13. The phosphoric acid ester derivative according to claim 4, wherein the ether oxygen atoms of Y are contained in radicals of at least one of polytetrahydrofuran, polyoxetanes or polyoxiranes.

14. The phosphoric acid ester derivative according to claim 7, wherein the diisocyanate is at least one of toluene 2,4-diisocyanate or isophorone diisocyanate.

* * * * *